United States Patent [19]

Togawa

[11] Patent Number: 5,332,891
[45] Date of Patent: Jul. 26, 1994

[54] CARD LOADING APPARATUS HAVING RELEASING MEANS FOR RELEASING PRESSURE TO AN OPTICAL CARD

[75] Inventor: Tsuyoshi Togawa, Tokyo, Japan

[73] Assignee: Olympus Optical Co., Ltd., Tokyo, Japan

[21] Appl. No.: 846,561

[22] Filed: Mar. 5, 1992

[30] Foreign Application Priority Data

Mar. 25, 1991 [JP] Japan ................................. 3-83004

[51] Int. Cl.⁵ ............................................. G06K 13/00
[52] U.S. Cl. ................................... 235/485; 235/475; 235/479; 235/483; 235/486
[58] Field of Search ............... 235/486, 475, 479, 483, 235/484, 485, 495, 441, 454, 476, 481

[56] References Cited

U.S. PATENT DOCUMENTS

| | | | |
|---|---|---|---|
| 3,692,981 | 9/1972 | Poylo et al. | 235/479 X |
| 4,575,703 | 3/1986 | Shishido | 235/479 X |
| 4,843,221 | 6/1989 | Ohtsuki et al. | 235/486 X |
| 4,931,622 | 6/1990 | Ohtsuki et al. | 235/486 X |
| 4,935,916 | 6/1990 | Suzuki et al. | 235/479 X |
| 5,051,566 | 9/1991 | Pernet | 235/479 X |

FOREIGN PATENT DOCUMENTS

| | | |
|---|---|---|
| 62-132264 | 6/1987 | Japan . |
| 63-9057 | 1/1988 | Japan . |
| 63-139849 | 6/1988 | Japan . |
| 1-304592 | 12/1989 | Japan . |
| 2-144686 | 6/1990 | Japan . |
| 0118682 | 5/1991 | Japan ................................. 235/475 |

OTHER PUBLICATIONS

Japanese Document No. 0144686, Togawa, Jun. 1990, Abstract.
Japanese Document No. 63-9057, Nakahara, Jan. 14, 1988, Abstract.
Japanese Document No. 63-139849, Imamura, Jun. 1988, Abstract.

Primary Examiner—Donald Hajec
Assistant Examiner—Esther Chin
Attorney, Agent, or Firm—Frishauf, Holtz, Goodman & Woodward

[57] ABSTRACT

A shuttle for loading thereon an optical card having upper and lower surfaces and right and left edges and for moving the card relative to a head to read/write information from/on the card, comprises a base, a reference end face connected to the base and abutting against the right edge of the card to guide the card, card stop members attached to the base and abutting against upper surface of the card to guide the card, a push plate attached to the base to be movable relative to the base, and abutting against the lower surface of the card to support the card with the card being interposed between the push plate and the card stop members, a mechanism for pressing the card against the card stop members by abutting against left edge of the card, and mechanism for releasing the card from pressure of the pressing mechanism when the push plate moves with respect to the base.

8 Claims, 7 Drawing Sheets

CARD LOADING APPARATUS HAVING RELEASING MEANS FOR RELEASING PRESSURE TO AN OPTICAL CARD

BACKGROUND OF THE INVENTION

1. Field of the Invention

The present invention relates to a card loading apparatus for loading an information recording card, e.g., an optical card thereon. The card loading apparatus is used in a reader/writer which reads data from/writes data on the card.

2. Description of the Related Art

Recent developments in the information-related industry have been remarkable and the quantity of information which can be handled is ever increasing. Thus, an optical card has prospective use since it has a larger memory capacity and is more portable than any other information recording card.

A plurality of parallel tracks are formed on an optical card in the longitudinal direction of the optical card. Reading/writing of information from/on the optical card are performed by a reader/writer.

A card loading apparatus, i.e., a shuttle is provided in the reader/writer. A holding position is defined on the shuttle, and the optical card is positioned and held at the holding position. The shuttle is linearly reciprocal in a direction parallel to the tracks of the optical card.

An optical head is arranged in the reader/writer. The optical head has an objective lens and an actuator for driving the objective lens. The optical head is movable in a tracking direction perpendicular to the moving direction of the shuttle.

In this reader/writer, if the optical card is not accurately positioned on the holding position on the shuttle, the moving direction of the shuttle and the direction of the tracks of the optical card are deviated from each other to cause skew of the optical card. When the degree of skew is small, the skew can surely be corrected by the actuator described above. However, when the degree of skew is large, the above described actuator needs to be shifted by an additional actuator. These two actuators need separate servo mechanisms for appropriately controlling them. This leads to an increase in cost.

Therefore, it is necessary to position the optical card at the holding position on the shuttle accurately. For this purpose, the shuttle needs to provide a pressing means which presses the optical card in the widthwise direction of the card. The pressing means has a reference member and a press member. The reference member serves as a reference for positioning the optical card at the holding position and the press member presses the optical card against the reference member.

An optical card tends to bend as it is carried in a purse or pass holder. Hence, the shuttle needs a function of correcting the bend of the optical card. However, when the optical card is inserted in and/or discharged from the shuttle, the correction of the bend serves as a resistance to cause an increase in load to the motor or wear of the card. Therefore, the optical card must be capable of being released from the correction of the bend when required.

Published Unexamined Japanese Patent Application No. 1-304592 discloses a shuttle having a correcting function of this type and a press means for the widthwise direction described above. Although the optical card can be released from the correction of the bend, it cannot be released from the pressure of the press means. Accordingly, an insertion resistance of the optical card onto the shuttle and a discharge resistance of the optical card from the shuttle cannot be greatly decreased, and damage to the optical card cannot be completely eliminated. The press means for the widthwise direction of the optical card can degrade the flatness of the card on the shuttle.

SUMMARY OF THE INVENTION

It is an object of the present invention to provide a card loading apparatus which can smoothly insert and discharge an information recording card and which will not damage an information recording card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A card loading apparatus according to the first embodiment of the present invention will be described with reference to FIGS. 1 to 5.

Figure 1:
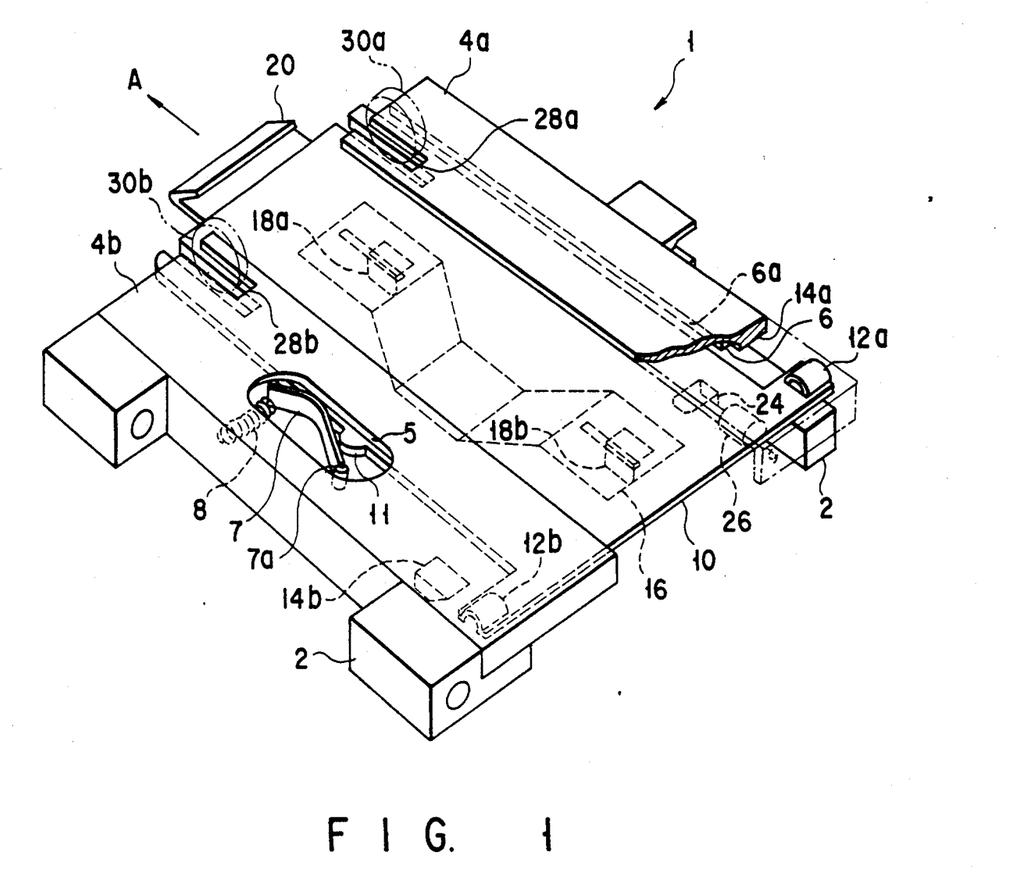
FIG. 1 is a perspective view showing a card loading apparatus according to the first embodiment of the present invention.

Referring to FIG. 1, reference numeral 1 denotes a thin box-shaped card loading apparatus, i.e., a shuttle. A bottom wall and two side walls of the shuttle 1 are constituted by a base 2. The base 2 is supported by guide portions projecting from its side wall to be movable along a data track of an optical card 3, i.e., in a direction indicated by an arrow A in FIG. 1. The optical card 3 is not shown in FIG. 1 for the sake of simplicity.

An upper wall of the shuttle 1 is constituted by card stop members 4a and 4b which are fixed on the upper surface of the side wall of the base 2. Reference numeral 4a denotes a right card stop member; and 4b, a left card stop member. These card stop members 4a and 4b constitute a second guide member, respectively.

The card stop members 4a and 4b are bent downward at 90° at the rear end portion of the base 2. The space between the right card stop member 4a and the left card stop member 4b corresponds to a data area of the optical card 3.

A positioning portion 6 extends on the lower surface of the right card stop member 4a in the direction indicated by the arrow A in FIG. 1. The left side surface of the positioning portion 6 forms a reference end face 6a for positioning the right side edge of the optical card 3. The reference end face 6a constitutes a first guide member.

An opening 5 is formed in the left card stop member 4b. A bent press plate 7 is inserted in the opening 5 to be locally located in it. The upper surface of the press plate 7 has substantially the same level as that of the upper surface of the card stop member 4b. A vertical pin 7a is loosely inserted in the proximal end portion of the press plate 7, so that press plate 7 is pivotal about the pin 7a in a horizontal plane.

As described above, since the upper surface of the press plate 7 has substantially the same level as that of the upper surface of the card stop member 4b, when the press plate 7 is pivoted about the pin 7a, it is brought into contact with the inner side surface of the opening 5 so that the inner side surface of the opening 5 serves as a stopper to prevent the press plate 7 from entering below the left stop member 4b. The lower end portion of the pin 7a is firmly fixed to the card base 2, and its upper end portion forms a free end.

One end portion of a compression coil spring 8 is fixed at the distal end portion of the press plate 7, and its other end is fixed at the left side wall of the card base 2. The press plate 7 and the compression coil spring 8 constitute pressing means.

A push plate 10 constituted by a thin flat plate and constituting a support member is provided in the shuttle 1. The push plate 10 has a width and a length respectively smaller and larger than those of the optical card 3. The left side surface of the push plate 10 forms a semispherical projecting portion at substantially the central portion along its lengthwise direction. This projecting portion is referred to as a semispherical surface 11. The semispherical surface 11 constitutes releasing means for releasing the optical card 3 from pressure of the press plate 7, and constitutes a spacing member. The distance between the outer end of the semispherical surface 11 and the reference end face 6a is larger than the width of the optical card 3.

Two side surfaces of the rear portion of the push plate 10 project in the widthwise direction of the push plate 10, and the distal ends of these projections form upward projections 12a and 12b.

Figure 3:
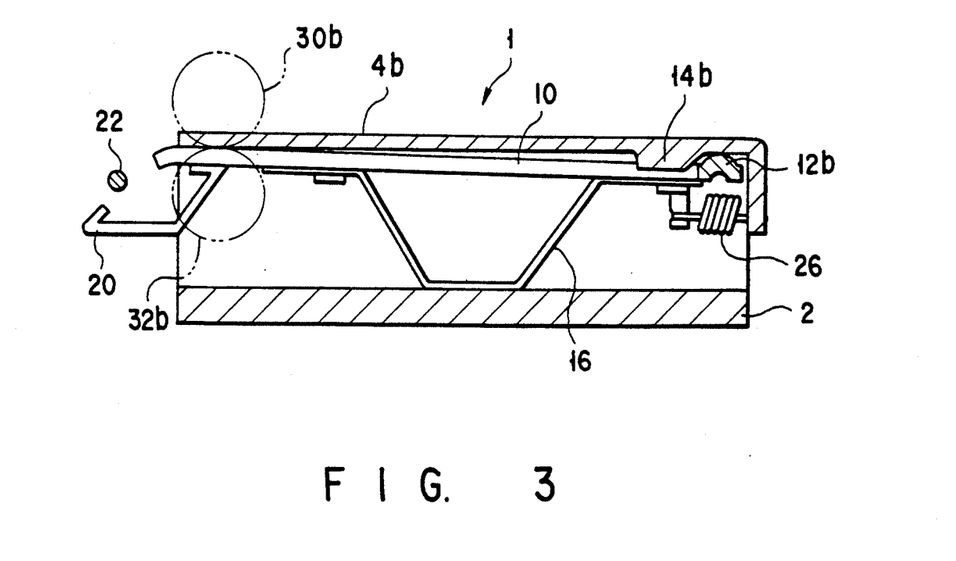
FIG. 3 is a sectional view showing a state in which an optical card is not present in the apparatus.

Downward protrusions 14a and 14b are formed on the lower surfaces of the card stop members 4a and 4b. The downward protrusions 14a and 14b are corresponding to the projections 12a and 12b. The projections 12a and 12b and protrusions 14a and 14b constitute means for releasing the optical card 3 from the pressure of a leaf spring 16 which will be described below. The protrusions 14a and 14b are formed at positions where they do not contact the projections 12a and 12b, respectively, when the rear end face of the push plate 10 is abutted against the bent inner side surfaces of the rear end portions of the card stop members 4a and 4b, respectively, as shown in FIGS. 1 and 3.

The distance between the projections 12a and 12b and that between the protrusions 14a and 14b are sufficiently large when compared to the width of the optical card 3 and thus do not interfere with the optical card 3 upon insertion/discharge or loading.

The sum of the projecting amounts of the projections 12a and 12b and those of the protrusions 14a and 14b is set to be larger than the thickness of the optical card 3. Accordingly, when the card stop members 4a and 4b are moved relative to the push plate 10 to engage the projections 12a and 12b with the protrusions 14a and 14b, respectively, the distance between the lower surface of the card stop member 4a or 4b and the upper surface of the push plate 10 becomes larger than the thickness of the optical card 3.

The projecting amount of each of the projections 12a and 12b and of each of the protrusions 14a and 14b is set to be smaller than the thickness of the optical card 3.

Figure 2:
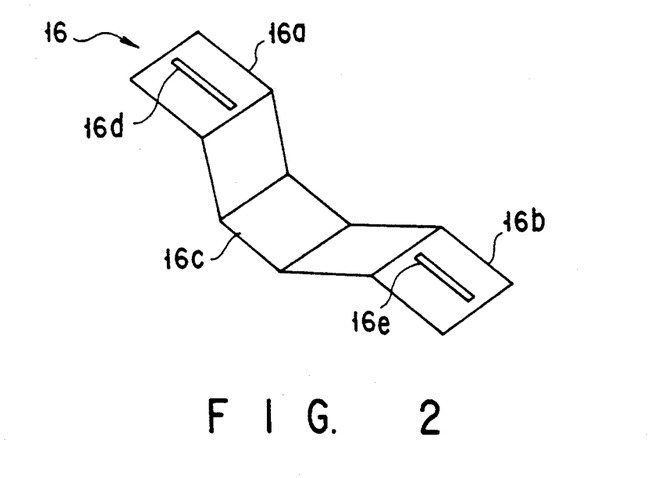
FIG. 2 is a perspective view of a leaf spring.

The push plate 10 is supported and urged upward by a leaf spring 16 as urging means. The leaf spring 16 has a shape as shown in FIG. 2 and has front and rear slide portions 16a and 16b and a bottom portion 16c. Slots 16d and 16e are formed in the front and rear slide portions 16a and 16b, respectively.

L-shaped lock members 18a and 18b fixed at the lower surface of the press plate 10 are inserted in the slots 16d and 16e, respectively. The bottom portion 16c of the leaf spring 16 is fixed at the bottom surface of the card base 2. The leaf spring 16 has a biasing force for biasing the push plate 10 upward to sufficiently correct the warp of the optical card 3.

Figure 4:
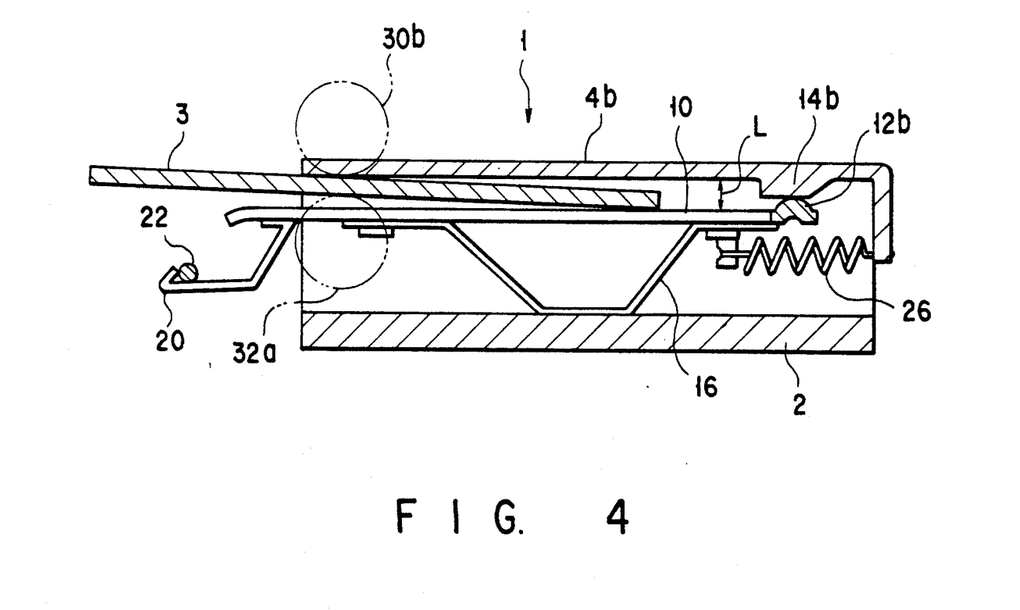
FIG. 4 is a sectional view showing a state in which a card is inserted in the apparatus.

The proximal end portion of a hook 20 is fixed at the front portion of the lower surface of the push plate 10. The distal end portion of the hook 20 is bent at an acute angle. The distal end portion of the hook 20 projects from the shuttle 1 as shown in FIGS. 3 and 4.

A pin 22, provided in the housing of the reader/writer (not shown) to be vertically movable and be capable of being locked, is located above the distal end portion of the hook 20, and the hook 20 is moved downward by the pin 22. The pin 22 is moved and locked by an actuator (not shown). The pin 22 is disposed in the vicinity of the shift range of the shuttle 1 for reading/writing information from/on the optical card 3 (to be referred to as a "read/write shift range" hereinafter). The pin 22 is disposed in the vicinity of the insertion port of the apparatus. Accordingly, the pin 22 can push the hook 20 downward when the shuttle 1 is in the read/write shift range. By this operation, the optical card 3 can be loaded or ejected within the read/write shift range. As a result, the overall shift range of the shuttle 1 is decreased to decrease the size of the apparatus. Note that the pin 22 is not shown in FIG. 1 for the sake of simplicity.

The distal end portion of a return spring 26 is attached to a mount portion which is formed on the left side rear portion of the lower surface of the press plate 10. The proximal end portion of the return spring 26 is attached to on the card stop member 4a. The return spring 26 is constituted by a tension coil spring.

Slots 28a and 28b are formed in the front portions of the card stop members 4a and 4b, respectively, and loading rollers 30a and 30b are inserted in the slots 28a and 28b, respectively. The loading rollers 30a and 40b are rotatable around an axis extending in a direction perpendicular to the longitudinal direction of the optical card 3. The loading rollers 30a and 40b are driven by a motor (not shown). Counter rollers 32a and 32b opposing the rollers 30a and 30b, respectively, are disposed below them to be rotatable and vertically movable. The counter rollers 32a and 32b are not shown in FIG. 1 for the sake of simplicity.

An operation of the first embodiment will be described.

When the optical card 3 is to be loaded on the shuttle 1, the whole shuttle 1 is moved to a position where the distal end portion of the hook 20 is able to be engaged with the pin 22. After the shuttle 1 is moved, the pin 22 is moved downward to engage with the distal end portion of the hook 20, the push plate 10 is caused to incline forward against the force of the leaf spring 16, and the pin 22 is locked. In this state, since the pin 22 is locked on the housing of the reader/writer (not shown), movement of the push plate 10 is stopped.

The base 2 is moved toward the rear portion of shuttle 1, i.e., to the right in FIG. 3. Then, since the push plate 10 is kept stopped by the pin 22, the card stop members 4a and 4b are moved relative to the push plate 10 against the tensile force of the return spring 26. When the push plate 10 is moved, the projections 12a and 12b of the push plate 10 are brought into contact with the protrusions 14a and 14b of the card stop members 4a and 4b, respectively, as shown in FIG. 4, and the semispherical surface 11 is brought into contact with the press plate 7.

During this period of time, the upper surfaces of the front and rear slide portions 16a and 16b of the leaf spring 16 do not move together with the lower surface of the push plate 10 but slide on it. Thus, the leaf spring 16 will not be unpreferably bent or buckled by movement of the card stop members 4a and 4b.

When the projections 12a and 12b contact the protrusions 14a and 14b, respectively, the distance between the lower surface of the card stop member 4a or 4b and the upper surface of the push plate 10 becomes larger than the thickness of the optical card 3.

When the semispherical surface 11 contacts the press plate 7, the press plate 7 is pivoted against the pressure of the compression coil spring 8, and the distance between the reference end face 6a and the press plate 7 becomes larger than the width of the optical card 3.

Then, the loading rollers 30a and 30b are rotated so that the shuttle receives the optical card 3 which has been inserted through the insertion port into the reader/writer by the rollers 30a, 30b, 32a, and 32b. When the base 2 is moved forward, i.e., toward the insertion port, the projections 12a and 12b are separated from the protrusions 14a and 14b, respectively, and the semispherical surface 11 is separated from the press plate 7.

When the optical card 3 is completely inserted, the pin 22 is moved upward. Then, the leaf spring 16 moves the push plate 10 upward, i.e., toward the card stop members 4a and 4b, and the optical card 3 is clamped between the push plate 10 and the card stop members 4a and 4b to correct its warp.

Figure 5:
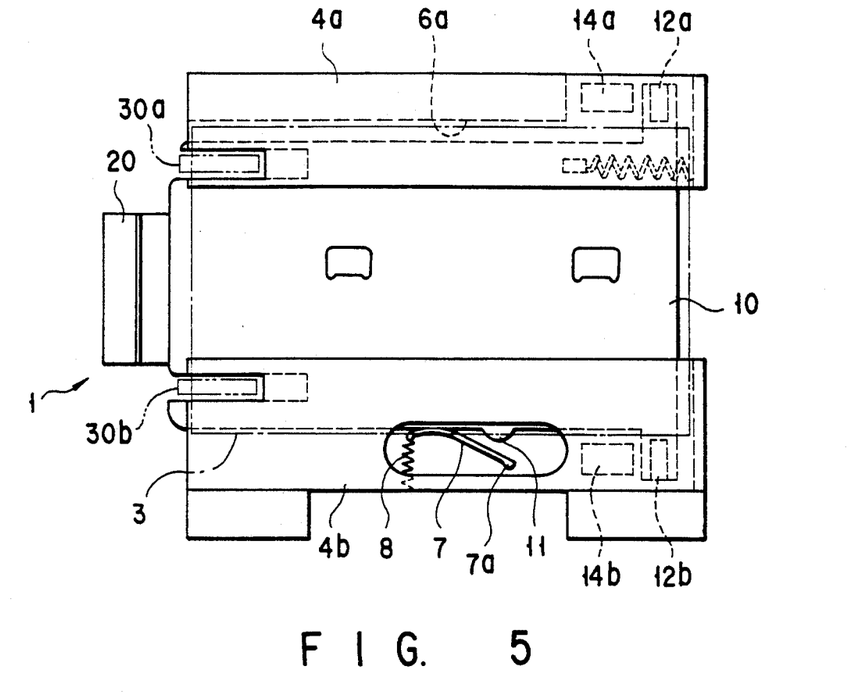
FIG. 5 is a plan view of the apparatus shown in FIG. 3.
Figure 6:
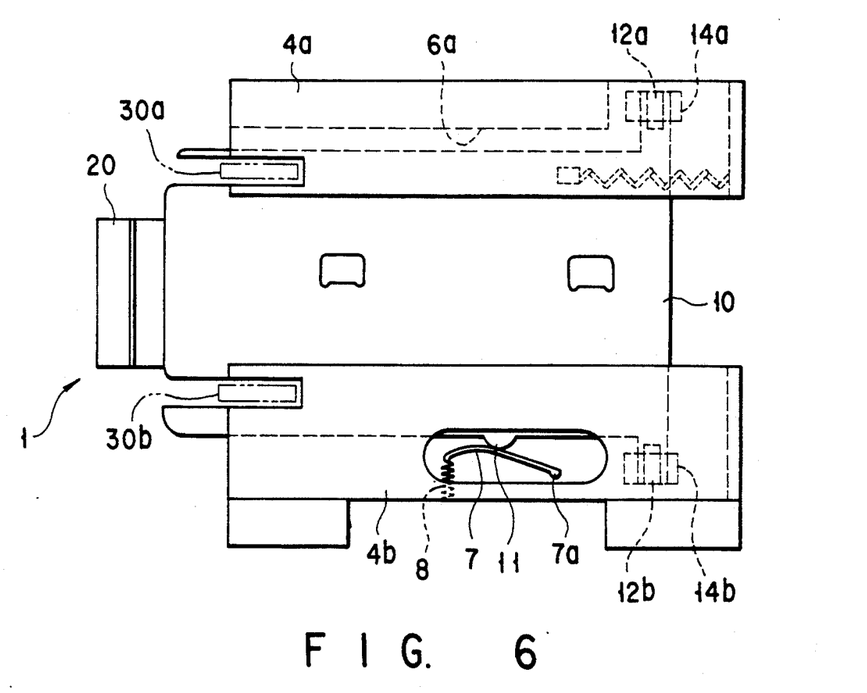
FIG. 6 is a plan view of the apparatus shown in FIG. 4.

Since the press plate 7 is forced by the compression coil spring 8 toward the reference end face 6a, as shown in FIG. 5, the press plate 7 is abutted against the left edge of the optical card 3 to urge it in the widthwise direction, thereby positioning the right edge of the optical card 3 with reference to the reference end face 6a.

Thereafter, the whole shuttle 1 is moved relative to a reading/writing head to read/write the data from/on the optical card 3.

Thereafter, the optical card 3 is discharged. This discharge operation is a reverse operation of the inserting operation described above and a detailed description thereof is omitted.

In this embodiment, the press plate 7 is urged against the left edge of the optical card 3 by the compression coil spring 8. However, the compression coil spring 8 may be omitted and the press plate 7 itself may be constituted by a leaf spring to have a biasing force. Alternatively, an elastically deformable member may be provided to the press plate 7.

As is described above, according to the first embodiment, since an unnecessary resistance is applied to the optical card during insertion and discharge of the optical card into and from the shuttle 1, a smooth inserting-/discharge operation can be performed. Accordingly, the optical card can be protected, and a force needed for insertion/discharge can be minimized.

Since the projecting amount of each of the projections 12a and 12b and of each of the protrusions 14a and 14b is smaller than the thickness of the optical card 3, these projecting portions will not adversely affect correction of warp of the optical card 3. Furthermore, since the leaf spring 16 is slidably mounted on the push plate 10 with its front and rear slide portions 16a and 16b, it will not be buckled.

Figure 7:
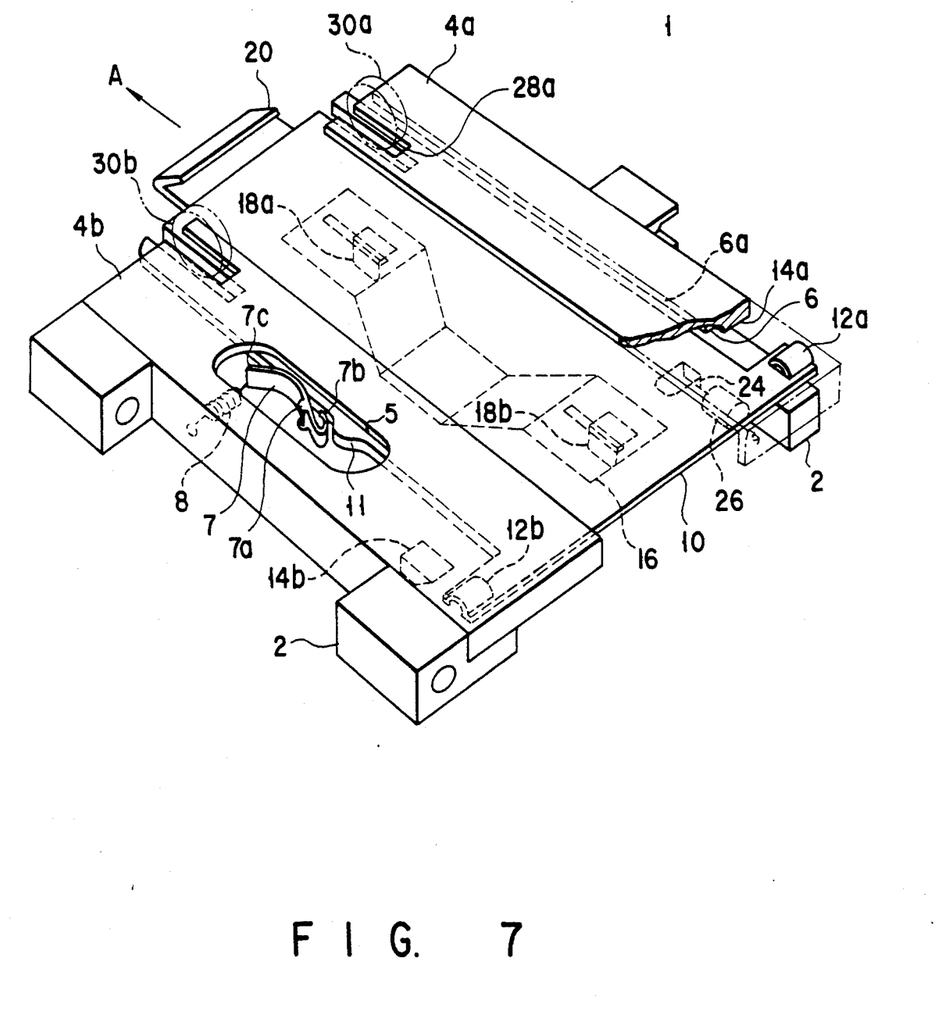
FIG. 7 is a perspective view showing a card loading apparatus according to the second embodiment of the present invention.

A card loading apparatus according to the second embodiment of the present invention will be described with reference to FIGS. 7 to 9. A description on the same arrangement and operation as in the first embodiment will be omitted and only the difference from the first embodiment will be described.

In this embodiment, a semispherical surface 11 of a push plate 10 is not strictly a semispherical surface but the connected part to the push plate 10 is moderately curved. A pin 7a is disposed not at a proximal end portion 7b but at the central portion of a press plate 7, and the proximal end portion 7b of the press plate 7 forms a hook. The press plate 7 is not urged by a compression coil spring 8 but by a tension coil spring 9.

Figure 8:
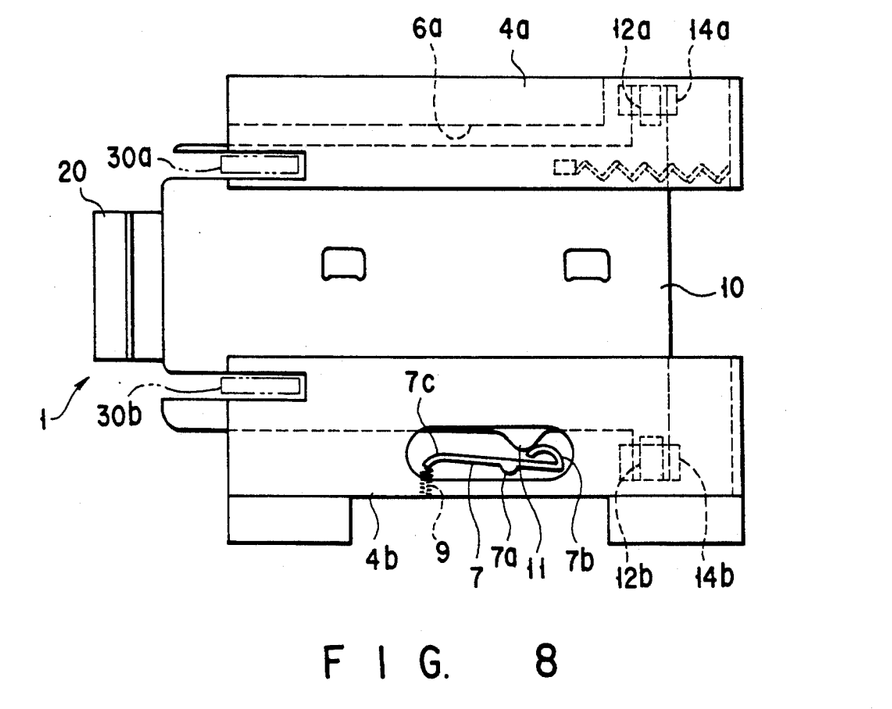
FIG. 8 is a plan view showing a state in which a distance between a push plate and press members is enlarged to be wider than a card thickness before card insertion.

In the second embodiment having the above arrangement, upon card insertion, since a distal end portion 7c of the press plate 7 is located in the left, i.e., at a lower position in FIG. 8 by the force of the tension coil spring 9, the distance between the distal end portion 7c of the press plate 7 and a reference end face 6a is larger than the card width.

After the optical card 3 is completely loaded or inserted into the shuttle, the optical card 3 will be clamped, i.e., pressed. At this time, the card push plate 10 is moved backward, i.e., to the right in FIG. 8. The proximal end portion 7b of the press plate 7 is brought into contact with the semispherical surface 11 by this movement, as shown in FIG. 9, and is pivoted clockwise about the pin 7a against the force of the tension coil spring 9. At this time, the distance between the proximal end portion 7b of the press plate 7 and the reference end face 6a becomes smaller than the card width. The press plate 7 itself and/or its proximal end portion 7b is elastically deformed to press the optical card 3 toward the reference end face 6a.

Figure 9:
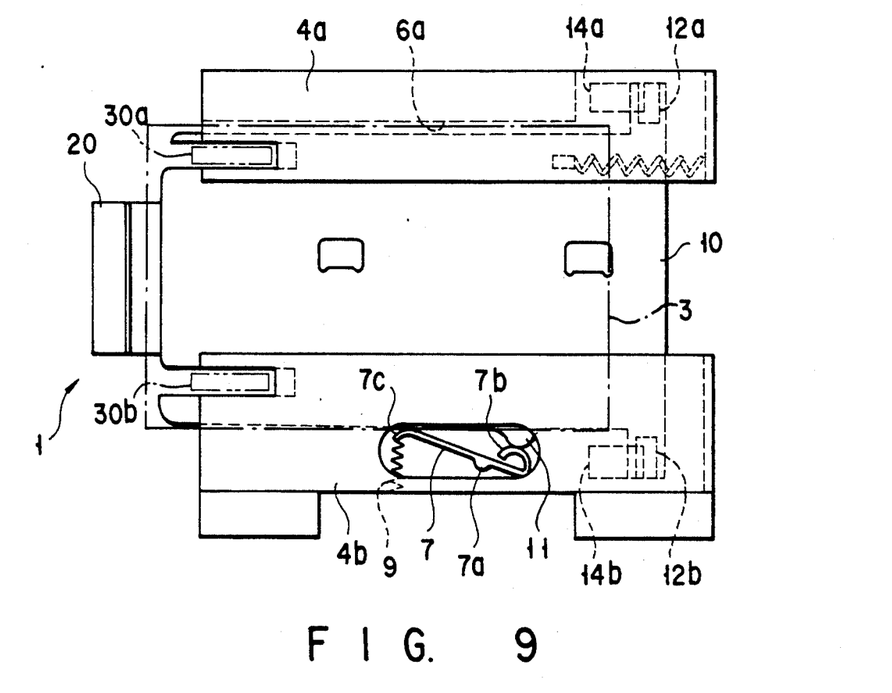
FIG. 9 is a plan view showing a state of the apparatus in which card insertion is completed, and a card is pressed against a positioning portion.
Figure 10:
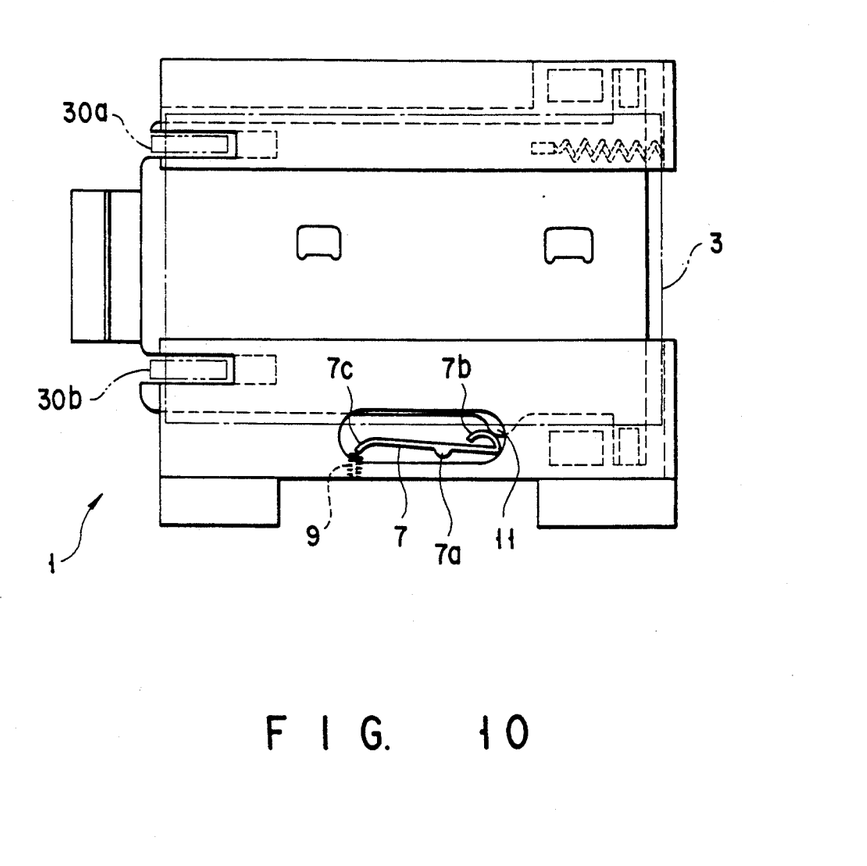
FIG. 10 is a plan view of the apparatus in which a card is interposed.

When the card push plate 10 is further moved backward, i.e., to the right in FIG. 9 from above state, the proximal end portion 7b of the press plate 7 which has been in contact with the semispherical surface 11 is pivoted counterclockwise about the pin 7a by the force of the tension coil spring 9, as shown in FIG. 10, and the distance between the reference end face 6a and the distal end portion 7c of the press plate 7 is increased to be larger than the card width. In this manner, the optical card 3 is clamped between the push plate 10 and the stop members 4a and 4b while no pressure is applied to the optical card 3 in the widthwise direction of the card. Therefore, even if the optical card 3 is a flexible one, it can be flatly placed on the shuttle 1.

The optical card 3 can be discharged from the shuttle 1 in accordance with a sequence reverse to that for insertion.

Except for the above, the arrangement and operation of the second embodiment are the same as in the first embodiment.

As described above, according to the second embodiment, the optical card 3 can be smoothly inserted in and discharged from the shuttle 1 as in the first embodiment.

The third embodiment of the present invention will be described. A description on the same arrangement and operation as in the first embodiment will be omitted and only the difference from the first embodiment will be described.

In the first embodiment, the hook 20 is pushed downward using the pin 22 which is moved by the actuator, and the optical card 3 can be loaded and ejected within the read/write shift range. However, in the third embodiment, the hook 20 is pushed downward by moving the shuttle 1 itself so that the optical card 3 can be loaded and ejected out of the read/write shift rage.

In the third embodiment, four projections (projections 12a and 12b; 13a and 13b) are formed on a push plate 10, and four protrusions (protrusions 14a and 14b; 15a and 15b) are formed on the stop members 4a and 4b. As FIGS. 11 and 12 are sectional views, they show the projections and protrusions only on the left side of a shuttle 1.

Figure 11:
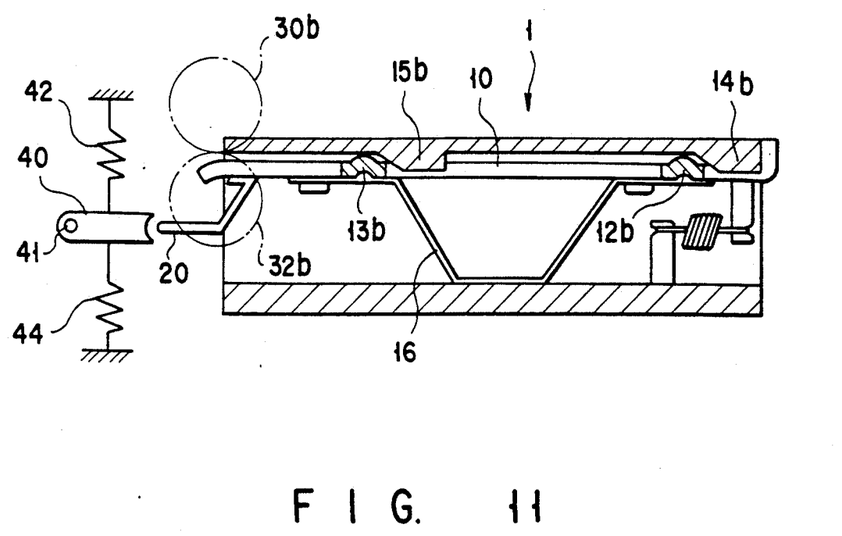
FIG. 11 is a sectional view showing a card loading apparatus according to the third embodiment of the present invention in which a card is not present.

When the optical card 3 is to be inserted in the shuttle 1 of this embodiment, the whole shuttle 1 is moved forward, i.e., to the left in FIG. 11, to bring the hook 20 into contact with a lever 40 provided in the housing of the reader/writer.

The distal end portion of the lever 40 is arcuatedly notched so that the hook 20 easily contact the lever 40. The proximal end portion of the lever 40 is rotatable about a pin 41. The distal end portions of first and second springs 42 and 44 are fixed at the central portion of the lever 40. The first and second springs 42 and 44 are constituted by tension springs. The proximal end portions of the first and second springs 42 and 44 are fixed to the housing of the reader/writer.

Figure 12:
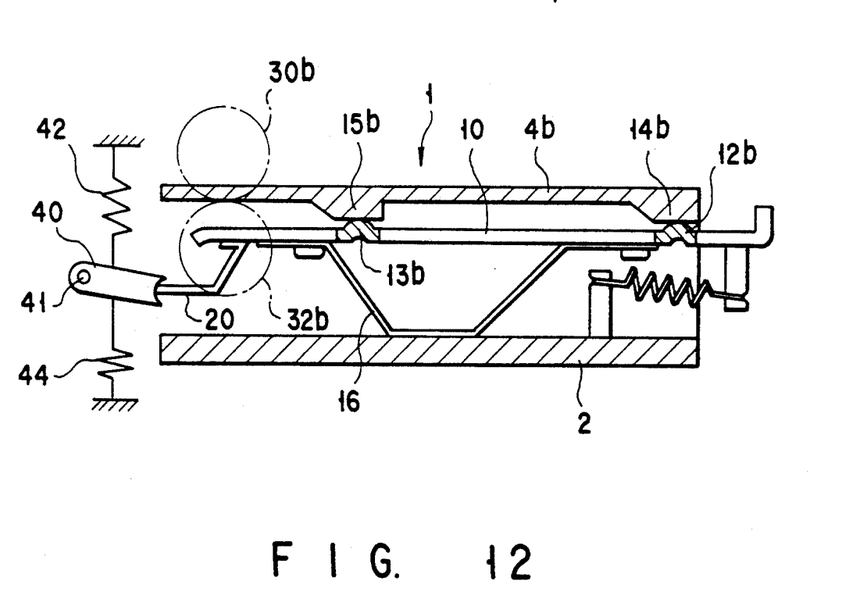
FIG. 12 is a sectional view of the apparatus to which a card can be inserted.

When the shuttle 1 is moved forward, the distal end portion of the hook 20 is brought into contact with the distal end portion of the lever 40, as shown in FIG. 12, to move the push plate 10 backward. When the projections 12a, 12b, 13a, and 13b are engaged with the protrusions 14a, 14b, 15a, and 15b, respectively, the distance between the push plate 10 and the stop member 14a and 14b is increased to be larger than the card thickness, and card insertion becomes possible.

Except for this, the arrangement and operation of the third embodiment are the same as in the first embodiment.

With the arrangement of the third embodiment, the hook 20 can be pushed downward without using an actuator but only by a drive source for moving the shuttle 1.

In the third embodiment, a shuttle having four projections and four protrusions have been described. However, even in the shuttle of the first or second embodiment, the hook 20 can be pushed downward by using both of the lever and the springs 42 and 44.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A card loading apparatus for loading thereon an information recording card having two opposite surfaces and two opposite side edges and for moving the card relative to a head to read/write information from-/on the card, comprising:

a base;

a first guide member coupled to the base and abutting against said one side edge of the card to guide the card;

a second guide member coupled to the base and abutting against said one surface of the card to guide the card;

a support member mounted to the base to be movable relative to the base, and abutting against the other surface of the card to support the card with the card being interposed between the support member and the second guide member;

means for pressing the card against the first guide member by abutting against the other side edge of the card;

first means for releasing the card from pressure of the pressing means when the supporting member moves with respect to the base;

means for urging said support member to the second guide member to press the card against the second guide member; and second means for releasing the card from the pressure of the urging means when the support member moves with respect to the base;

wherein said second means for releasing the card from the pressure of the urging means includes:

a first projecting portion formed on the second guide member and projecting toward the base, a second protruding portion formed on the support member and projecting toward the second guide member, and said second projecting portion contacting said first projecting portion when the support member moves with respect to the base.

2. 8. An apparatus according to claim 1, wherein a sum of projecting amounts of said first projecting portion and of said second protruding portion is larger than a thickness of the card.

3. An apparatus according to claim 1, wherein said urging means comprises an elastic member having a bottom portion fixed to the base and two end portions slidably attached to the support member, to support the support member to be movable with respect to the base.

4. An apparatus according to claim 2, wherein said pressing means includes a press plate urged in a direction toward the first guide member to abut the other side edge of the card, and said first releasing means includes a spacing member connected to the support member and brought into contact with the press plate, when the support member moves with respect to the base, to separate the press plate from the other side edge of the card.

5. An apparatus according to claim 2, wherein said pressing means includes a press plate movable to abut the other side edge of the card and thereby press said one side edge of the card against said first guide member, and a spacing member connected to the support member and brought into contact with the press plate, when the support member moves with respect to the base, to place the press plate into abutment with the other side edge of the card, and said first releasing means includes resilient means urging said press plate away from the other side edge of the card.

6. An apparatus according to claim 5, wherein said press plate is pivotable and said spacing member contacts one end of said press plate so as to place another end of said press plate into momentary abuttment with the other side edge of the card during only a part of the movement of the support member with respect to the base so that, at termination of such movement, such abutment is broken due to the resilient means.

7. A card loading apparatus for loading thereon an information recording card having two opposite surfaces and two opposite side edges and for moving the card relative to a head to read/write information from-/on the card, comprising:

a base;

a first guide member coupled to the base and abutting against said one side edge of the card to guide the card;

a second guide member coupled to the base and abutting against said one surface of the card to guide the card;

a support member mounted to the base to be movable relative to the base, and abutting against the other surface of the card to support the card with the card being interposed between the support member and the second guide member;

means for pressing the card against the first guide member by abutting against the other side edge of the card; and means for releasing the card from pressure of the pressing means when the supporting member moves with respect to the base;

wherein said pressing means includes a press plate movable to abut the other side edge of the card and thereby press said one side edge of the card against said first guide member, and a spacing member connected to the support member and brought into contact with the press plate, when the support member moves with respect to the base, to place the press plate into abutment with the other side edge of the card, and said releasing means includes resilient means urging said press plate away from the other side edge of the card.

8. An apparatus according to claim 7, wherein said press plate is pivotable and said spacing member contacts one end of said press plate so as to place another end of said press plate into momentary abuttment with the other side edge of the card during only a part of the movement of the support member with respect to the base so that, at termination of such movement, such abutment is broken due to the resilient means.

* * * * *